No. 610,177. Patented Sept. 6, 1898.
R. GAERTNER.
RUNNING GEAR FOR MOTOR CYCLES.
(Application filed Nov. 22, 1897.)
(No Model.)
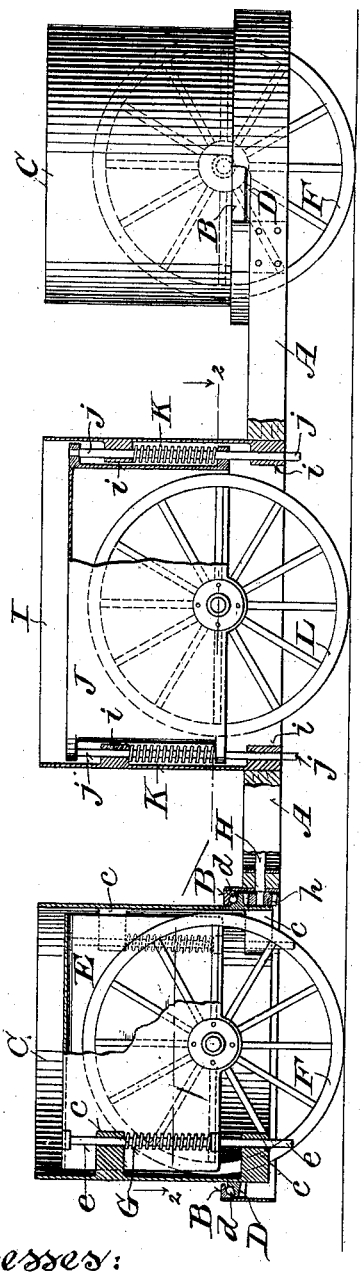
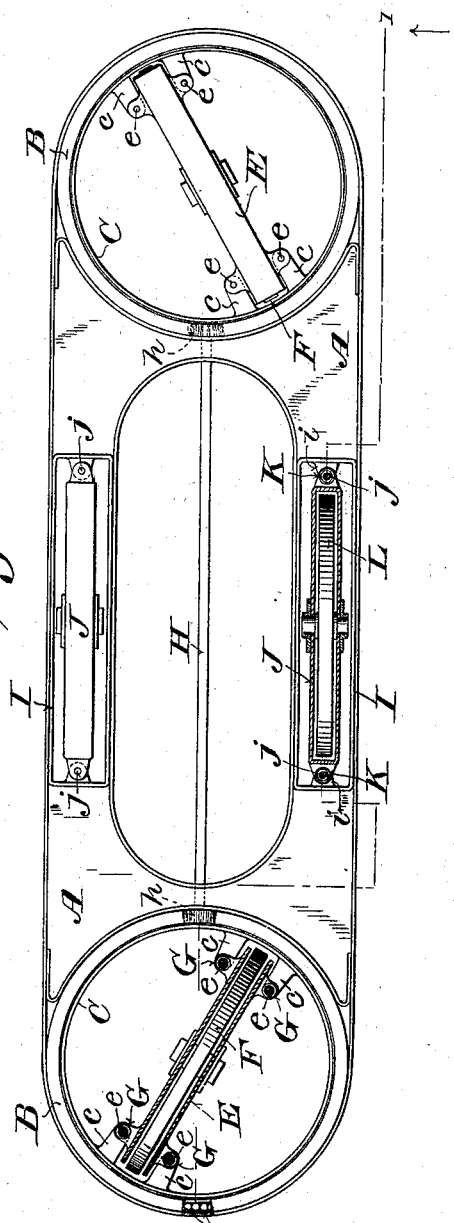

UNITED STATES PATENT OFFICE.

RICHARD GAERTNER, OF MILWAUKEE, WISCONSIN.

RUNNING-GEAR FOR MOTOR-CYCLES.

SPECIFICATION forming part of Letters Patent No. 610,177, dated September 6, 1898.

Application filed November 22, 1897. Serial No. 659,380. (No model.)

*To all whom it may concern:*

Be it known that I, RICHARD GAERTNER, of Milwaukee, in the county of Milwaukee and State of Wisconsin, have invented certain new and useful Improvements in Running-Gear for Motor-Cycles; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to running and steering gear for motor-cycles. Its main objects are to produce sufficient traction on the driving-wheels to insure the propulsion of the vehicle, to facilitate steering the vehicle, to advantageously dispose the traveling or supporting wheels, and to maintain their points of contact with the ground in the same relation to each other whether running straight or turning, and generally to improve the construction and operation of the running-gear of this class of vehicles.

It consists of certain novel features in the construction and arrangement of component parts of the running and steering gear of motor-cycles, as hereinafter particularly described, and pointed out in the claims.

In the accompanying drawings like letters designate the same parts in both figures.

Figure 1 is a side elevation and partial vertical longitudinal section on the line 1 1, Fig. 2, of the running-gear of a motor-cycle embodying my improvements; and Fig. 2 is a plan view and partial horizontal section of the same on the line 2 2, Fig. 1.

A designates the body or main frame, which may be constructed of any suitable material and of any desired size and shape, preferably long and comparatively narrow, as shown in Fig. 2. It is provided at the ends with horizontally-disposed rings B B, which are rigidly attached thereto.

C C are cylindrical housings loosely fitting inside of the rings B B and provided at or near their lower ends on the outside with annular bearings D, which project under the rings B, and thus support the main frame A at the ends and allow the housing C to turn horizontally therein.

E E are wheel-frames which are formed or provided with bearings for the guiding-wheels F F and are contained within the housings C. They are connected with said housings, so as to admit of a vertical movement of said wheels, by vertically-disposed rods $e\, e$, which are rigidly secured to the wheel frames or casings and slide endwise in bearings $c\, c$, provided therefor in said housings. Spiral springs G G, placed on said rods between their lower connections with the wheel-frames and their upper bearings $c$, yieldingly support the ends of the main frame upon the guiding-wheels F. The opposing faces of the rings B and the annular bearings D are grooved or formed with ball-races, and balls or antifriction-rollers $d$ are interposed between them in said grooves or races to facilitate the turning of the wheel-housings for steering the vehicle.

The bearings D are formed or provided on the under side with circular racks which mesh with pinions or gears $h\, h$ on the ends of a shaft H, which is supported lengthwise of the frame by suitable bearings therein. Any convenient or suitable means (not shown) are to be provided for turning this shaft, by means of which the housings C and the guiding-wheels F are horizontally turned in opposite directions and are held in any desired position. One guiding-wheel is located centrally at each end of the vehicle, which is to be propelled by any suitable kind of motor or motors, (not shown,) preferably connected with the guiding-wheels F, which afford the greatest or most reliable traction.

I I are housings provided on each side of the frame A between its ends. J J are wheel frames or casings arranged within said housings and movably connected therewith by vertical rods $j\, j$, rigidly attached to said frames or casings and adapted to slide lengthwise in bearings $i\, i$ inside of said housings I. Springs K, placed on these rods $j$ between their connections with said wheel frames and housings, yieldingly support the main frame at the sides between its ends upon the wheels L L, which are journaled in said frames J.

By the construction and arrangement hereinbefore described it will be observed that the body or frame A and the greater part of the weight of the vehicle are carried low, and the distance of the bearing-points of the guiding-wheels F F from the bearing-points of the side supporting-wheels L L is constant, being the same when the vehicle is turning as when it is running straight. The vehicle is thus made to run with greater smoothness and steadiness and with less danger of tipping over.

I do not limit myself to the exact details of construction shown and described, as they may be variously modified without departure from the spirit and intended scope of my invention.

I claim—

1. Running-gear for motor-cycles, comprising a suitable frame, two guiding-wheels arranged centrally at the ends of the frame and capable of turning horizontally therein, steering connections adapted to turn said wheels in opposite directions, and supporting-wheels arranged on opposite sides of the center of the frame between the guiding-wheels and having vertically-yielding bearings, substantially as and for the purposes set forth.

2. Running-gear for motor-cycles, comprising a suitable frame provided at the ends with horizontally-disposed rings, two guiding-wheels carried, one at each end of the frame, in housings or frames provided with annular bearings which support and turn under the rings on the frame, steering mechanism connecting said wheel housings or frames and adapted to turn the same simultaneously in opposite directions, and supporting or balancing wheels arranged on opposite sides of the frame, substantially as and for the purposes set forth.

3. In running-gear for motor-cycles the combination with a main frame provided at or near the ends with horizontally-disposed rings, two wheel frames or housings having spring connections with annular bearings which support the rings on the main frame and are provided with circular racks, a longitudinal shaft provided with pinions which engage with said racks, guiding-wheels having bearings in said wheel frames or housings, and supporting-wheels arranged on opposite sides of the frame between the guiding-wheels, substantially as and for the purposes set forth.

4. In running-gear for motor-cycles the combination with a main frame provided at or near its ends with horizontally-disposed rings, cylindrical housings arranged concentrically within said rings and provided with similar rings which project under and carry those on the main frame, said rings being formed in their opposing faces with grooves or ball-races, balls or rollers interposed between said rings in said grooves or races, wheel-frames arranged within said housings and connected therewith by vertical rods which have sliding bearings with one of the connected parts, spiral springs placed on said rods between the housings and wheel-frames, guiding-wheels journaled one at each end of the main frame in said wheel-frames, steering mechanism arranged to turn said housings, wheel housings or frames having vertically-yielding connections with the main frame on opposite sides thereof and between the guiding-wheels and supporting-wheels journaled in said housings or frames, substantially as and for the purposes set forth.

5. In running-gear for motor-cycles the combination with a suitable frame of guiding-wheels having vertically-yielding bearings which are adapted to turn horizontally about axes perpendicular to the axes of the wheels at their centers, steering mechanism adapted to turn said wheel-bearings simultaneously in opposite directions, housings fixed to the frame on opposite sides, wheel-frames movably connected with said housings by vertical rods, springs interposed between said housings and frames and yieldingly supporting the main frame and wheels journaled in said wheel-frames, substantially as and for the purposes set forth.

In testimony that I claim the foregoing as my own I affix my signature in presence of two witnesses.

RICHARD GAERTNER.

Witnesses:
CHAS. L. GOSS,
C. J. MORRISON.